United States Patent
Macken et al.

(10) Patent No.: US 9,814,187 B2
(45) Date of Patent: Nov. 14, 2017

(54) PROCESS FOR MAKING A POLYURETHANE FOAM

(71) Applicant: Huntsman International LLC, The Woodlands, TX (US)

(72) Inventors: Johan Antoine Stefaan Macken, Tildonk (BE); Loredana Moro, Velaine-sur-Sambre (BE); Johannes Eduward Irene Marie Josefa Clerinx, Haasrode (BE); Annelies Vandevelde, Gingelom (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 313 days.

(21) Appl. No.: 14/353,504

(22) PCT Filed: Oct. 25, 2012

(86) PCT No.: PCT/EP2012/071162
§ 371 (c)(1),
(2) Date: Apr. 23, 2014

(87) PCT Pub. No.: WO2013/060779
PCT Pub. Date: May 2, 2013

(65) Prior Publication Data
US 2014/0296361 A1  Oct. 2, 2014

(30) Foreign Application Priority Data
Oct. 28, 2011  (EP) .................................... 11187197

(51) Int. Cl.
| | |
|---|---|
| *A01G 9/10* | (2006.01) |
| *A01G 31/00* | (2006.01) |
| *C08G 18/76* | (2006.01) |
| *C08G 18/10* | (2006.01) |
| *C08G 18/08* | (2006.01) |
| *C08G 18/48* | (2006.01) |
| *C08G 101/00* | (2006.01) |

(52) U.S. Cl.
CPC .......... *A01G 9/1086* (2013.01); *A01G 31/001* (2013.01); *C08G 18/10* (2013.01); *C08G 18/14* (2013.01); *C08G 18/7664* (2013.01); *C08G 18/4804* (2013.01); *C08G 18/4833* (2013.01); *C08G 18/4837* (2013.01); *C08G 2101/005* (2013.01); *C08G 2101/0083* (2013.01)

(58) Field of Classification Search
CPC ............ C08G 18/4804; C08G 18/4833; C08G 18/4837
See application file for complete search history.

(56) References Cited

U.S. PATENT DOCUMENTS

| | | |
|---|---|---|
| 3,798,836 A | 3/1974 | Rubens et al. |
| 3,889,417 A | 6/1975 | Wood et al. |
| 3,970,618 A | 7/1976 | Jabs et al. |
| 5,155,931 A | 10/1992 | Vansteenkiste et al. |
| 5,459,170 A | 10/1995 | Bleys et al. |
| 5,621,016 A | 4/1997 | Murty et al. |
| 6,479,433 B1 | 11/2002 | Hann et al. |
| 2005/0131095 A1 | 6/2005 | Yu et al. |
| 2005/0176840 A1* | 8/2005 | Chan ..................... C08G 18/10 521/159 |
| 2009/0286897 A1* | 11/2009 | Andries ............. C08G 18/6696 521/159 |

FOREIGN PATENT DOCUMENTS

| | | |
|---|---|---|
| WO | 96/16099 | 5/1996 |
| WO | 2011/042284 | 4/2011 |

\* cited by examiner

*Primary Examiner* — Melissa Rioja
(74) *Attorney, Agent, or Firm* — Huntsman International LLC; Robert Diaz

(57) ABSTRACT

Process for making a foam suitable as plant growth medium by reacting a polyisocyanate, a polyether polyol mixture and water at an isocyanate index of 90-150 wherein the polyol mixture used comprises at least 2 polyols and wherein the polyol mixture comprises less than 50% by weight oxyethylene calculated on the weight of the polyol mixture.

20 Claims, 3 Drawing Sheets

PROCESS FOR MAKING A POLYURETHANE FOAM

This application is the National Phase of International Application PCT/EP2012/071162 filed Oct. 25, 2012 which designated the U.S. and which claims priority to Foreign Application No. 11187197.6 filed Oct. 28, 2011. The noted applications are incorporated herein by reference.

The present invention relates to a process for making a polyurethane foam, to a plant growth medium comprising such a foam and to the use of such a foam as plant growth medium.

Plant growth media comprising polyurethane foams are known.

U.S. Pat. No. 3,798,836 discloses a water insoluble open celled foamed polyurethane matrix having dispersed therein thermoplastic particles.

U.S. Pat. No. 3,889,417 makes a hydrophilic foam by reacting a prepolymer with a high amount of water. This foam may be used in horticultural applications. The water index applied is 1300-78000. A similar process has been disclosed in WO 96/16099 wherein no special guidance as to the isocyanate index and the water index has been given; in the examples the water index was more than 1700 and the isocyanate index was less than 6. The prepolymers used are made from polyols having a molecular weight of at least 1000.

U.S. Pat. No. 3,970,618 discloses a substrate for cultivating plants which substrate is a low density (18 kg/m$^3$) hydrophilic polyurethane foam made by reacting a polyisocyanate and a polyol at a low NCO index, the polyol having an hydroxyl value of 900-1800 and the polyisocyanate being a toluene diisocyanate (TDI) type polyisocyanate.

U.S. Pat. No. 5,155,931 uses a foam as plant mat, which foam is made by reacting an organic isocyanate, which preferably is TDI, and a polyol at an NCO-index of 90-120.

U.S. Pat. No. 6,479,433 discloses a horticultural growing medium made by reacting a prepolymer and water in the presence of a selected filler material.

US 2005/0131095 discloses a process for making polyurethane foams at an NCO-index of 40-150. No special attention has been given to the water index; in the examples the NCO-index was between 85-106 and the water index varied between 93-120. However in this process the polyol mixture used has an overall high oxyethylene content (50-90% by weight) and no polyol having a medium oxyethylene content (<50% by weight). The obtained foams as illustrated in the examples are flexible foams having a resilience of at least 60% and a compression load deflection at 40% (CLD) below 10 kPa.

WO2011/042284 describes flexible polyurethane foams for use as plant substrates. These foams have a density of 25-70 kg/m$^3$, a compression load deflection at 40% (CLD) of 5-15 kPa and a volume increase at water saturation of at most 25%. These foams are made at a low isocyanate index of 20-70 and at a high water index of 200-400 which means that there is a huge competition between the isocyanate reactive components in the formulation to react with the available isocyanate components which may lead to frothing (of the draining water) when the foam is used as substrate material.

U.S. Pat. No. 5,459,170 discloses methods for the preparation of flexible polyurethane foams by reacting a polyisocyanate containing at least 85% by weight of 4,4'-diphenylmethane diisocyanate or a liquid variant thereof with a polyol composition comprising at least one poly(oxyethylene-oxyalkylene) polyol. The obtained foams have however a too high water uptake and show too much swelling making them not suitable as plant substrate material.

Figure 1A:
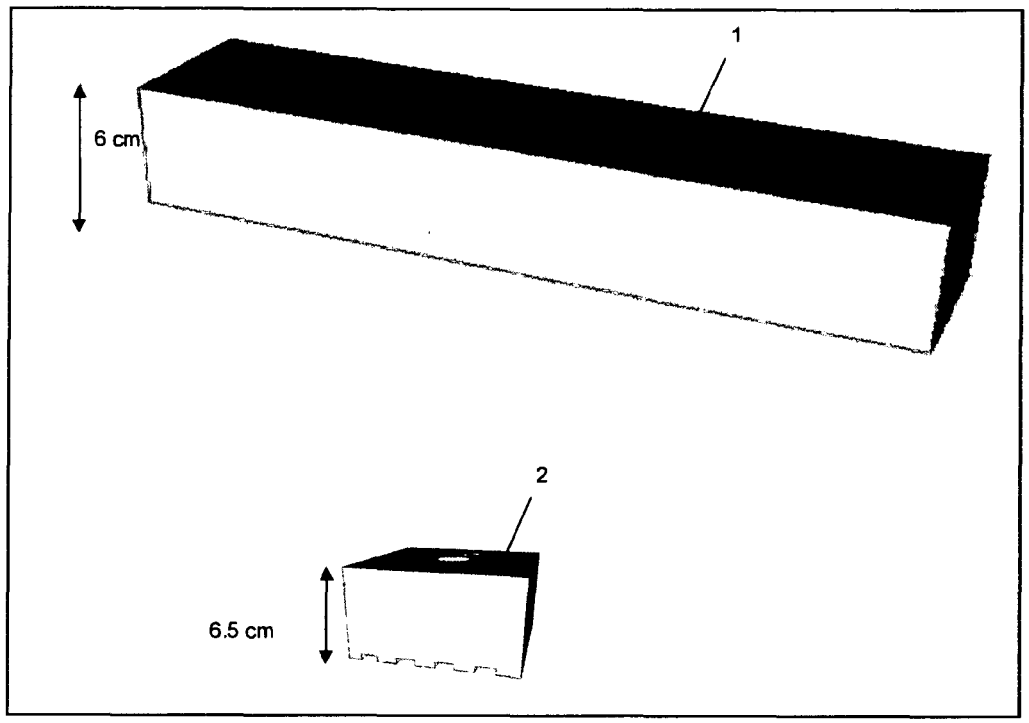
FIG. 1A is an isometric view of one embodiment of a slab and a cultivating block.

The above described polyurethane foams could be further improved in particular regarding water uptake and retention characteristics (further characterized as $pF_0$ and $pF_1$ values), foam stability and swelling at 100% water saturation together with a high compression load deflection at low density, the prevention of frothing and the prevention of growth inhibition in particular of young plants (seedlings).

Surprisingly, we have found that all above mentioned unwanted side effects (e.g. frothing, growth inhibition, . . . ) can be avoided by using a polyurethane foam fabricated at an isocyanate index in the range of 90 up to 150 in combination with a specific selection of isocyanates and polyether polyols.

Furthermore the foams according to the invention show excellent hardnesses which make them in particular very suitable for example for greenroof and landscaping applications. Furthermore the foams according to the invention show excellent water retention characteristics and low swelling at 100% water saturation which make them very suitable for use as plant growth substrate for the promotion of seed germination and seedling growth.

Therefore the present invention is concerned with a polyurethane foam suitable for plant growth and having a resilience of at most 40%, a compression load deflection (CLD) at 40% of at least 16 kPa, a free-rise core density of at least 20 kg/m$^3$ and a volume increase at water saturation of at most 25%.

The polyurethane foam according to the invention preferably has a CLD which is at least 20 kPa and more preferably at least 25 kPa, a density which is 20 up to 50 kg/m$^3$, a resilience which is at most 30% and a volume increase at water saturation of at most 20%.

The polyurethane foam according to the invention has in particular good water absorption (uptake) and water retention. Water uptake and in particular water retention of a polyurethane foam can be measured by determination of pF values and may be visualized by means of a water retention curve which is a plot of measured volumetric water content retained in the foam on the Y-axis versus applied under pressure on the X-axis (see FIG. 2A).

The polyurethane foam according to the invention preferably has a $pF_0$ value of at least 70%, preferably at least 80%, more preferably at least 90% wherein the $pF_0$ value is measured after subjecting a water saturated foam sample having dimensions of 100×120×75 mm to a pressure of 0 cm H$_2$O column for 30 minutes.

The polyurethane foam according to the invention may have a $pF_1$ value in the range of 10% up to 90% wherein the $pF_1$ value is measured after subjecting a water saturated foam sample of 100×120×75 mm to a pressure of −10 cm H$_2$O column for 24 hours.

The polyurethane foam according to the invention suitable for growing seedlings preferably has a $pF_1$ value of at least 50%, more preferably at least 60% and most preferably at least 70% wherein the $pF_1$ value is measured after subjecting a water saturated foam sample of 100×120×75 mm to a pressure of −10 cm $H_2O$ column for 24 hours.

Figure 1B:
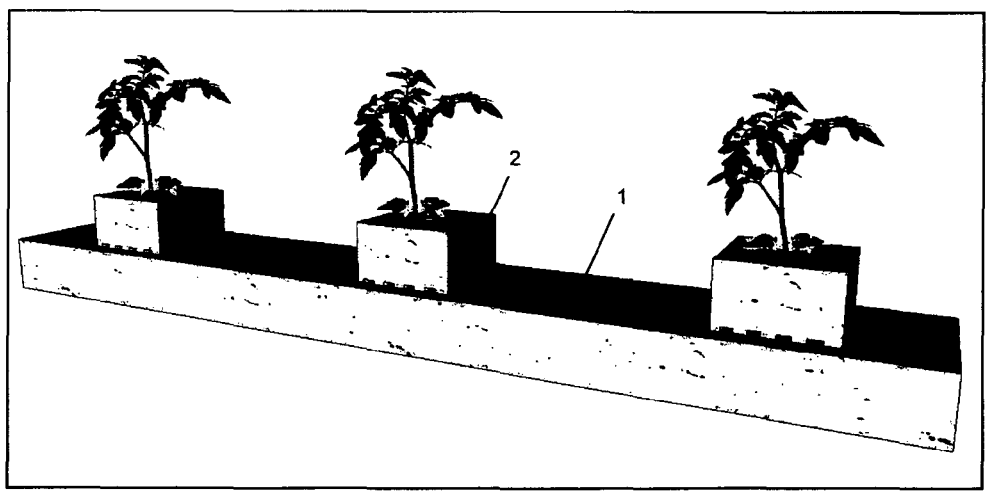
FIG. 1B is an isometric view of one embodiment of a cultivating block placed on a slab.
Figure 2A:
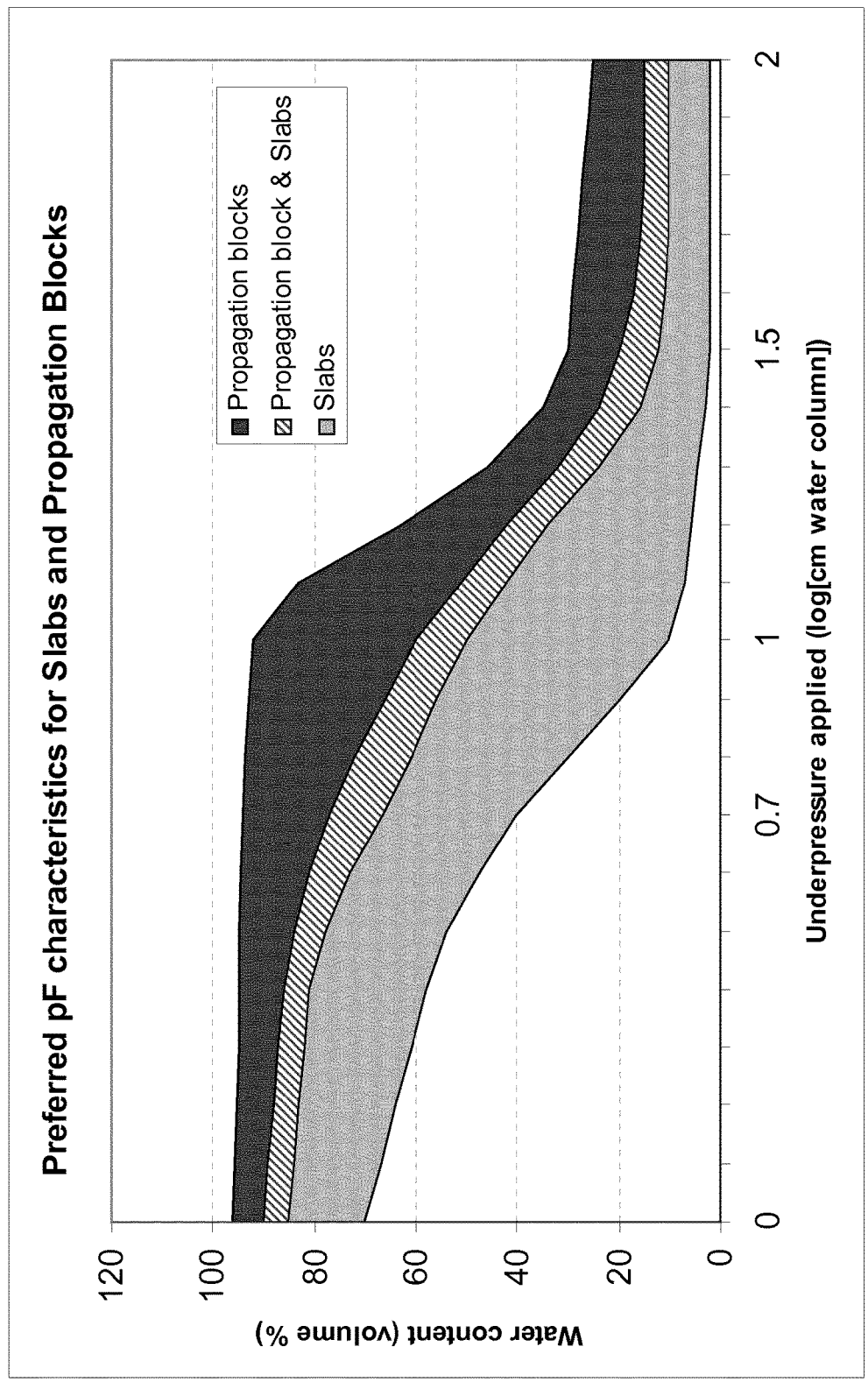
FIG. 2A illustrates pF characteristics of certain slabs and propagation blocks.

A foam according to the invention having $pF_1$ values in the range of 50% up to more than 75% is ideally suitable as plant growth medium for growing seedlings. The plant growth media according to the invention suitable for growing seedlings may be in the form of individual containers, also referred to as cultivating (propagation) blocks 2 and illustrated in FIG. 1A. Said cultivating blocks 2 may be placed on a larger plant growth medium according to the invention and which may be in the form of a slab 1. The combination of a plant growth system in which several cultivating blocks 2 are placed onto a slab 1 as illustrated in FIG. 1B is known and is in particular suitable for cultivating vegetables, fruit, flowers, etc in greenhouses. Cultivating (propagation) blocks according to the invention preferably have a $pF_1$ values in the range of 50% up to more than 75% while larger plant growth medium (slabs) according to the invention preferably have a $pF_1$ values in the range of 10% up to 50%. FIG. 2A illustrates preferred pF characteristics for slabs and propagation blocks.

Furthermore the present invention is concerned with a process for making a polyurethane foam.

The process disclosed in the present invention can be used to fabricate the above mentioned plant growth media made of polyurethane foam.

The process according to the present invention comprises reacting at an isocyanate index of 90-150:
 a polyisocyanate comprising diphenylmethane diisocyanate (MDI) and homologues thereof having an isocyanate functionality of 3 or more wherein the amount of diisocyanate calculated on the total amount of the diisocyanates and the homologues is 20-80% by weight, preferably 25-70% by weight and
 a first polyoxyethylene polyoxypropylene polyol having an average nominal hydroxy functionality of 2-6, an average molecular weight of 2000-12000, an oxyethylene content of more than 50% weight calculated on the weight of this polyol, and
 a second polyoxyethylene polyoxypropylene polyol having an average nominal hydroxy functionality of 2-6, an average molecular weight of 2000-6000, an oxyethylene content of 20-45% by weight calculated on the weight of this polyol, and
 a water content of 2-7 pbw, and
 wherein the weight ratio of the first and the second polyol used is ranging from 60:40 to 20:80.

Foams and processes for making polyurethane foams have been widely disclosed. However the foams and processes according to the present invention have not been disclosed. The foams of the present invention are unique since they combine good water retention properties with excellent foam characteristics such as stability, hardness and limited foam swelling at 100% water saturation.

The foams of the present invention are very suitable for use as plant growth medium since they have good wetting, water retention and water release properties.

The polyisocyanates used to make the polyisocyanate (prepolymer) are known in the art. They are widely called polymeric or crude MDI and mixtures of polymeric or crude MDI and MDI.

Polymeric or crude MDI comprise MDI and homologues having an isocyanate functionality of 3 or more and are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the average isocyanate functionality preferably ranges from 2.3-2.8. The NCO value of these polymeric or crude MDIs is at least 30% by weight. The polymeric or crude MDI contain diphenylmethane diisocyanate, the remainder being polymethylene polyphenylene polyisocyanates of functionality greater than two. If desired this polymeric or crude MDI may be mixed with MDI provided the polyisocyanate has the required amount of diisocyanates and homologues having an isocyanate functionality of 3 or more. The polyisocyanate used in the process according to the invention comprises 20-80%, preferably 25-70%, more preferably 25-55% by weight of MDI and 80-20%, preferably 75-30% and more preferably 75-45% by weight of homologues of MDI, the homologues having an isocyanate functionality of 3 or more, wherein both amounts are calculated on the total amount of polyisocyanate.

For example such polyisocyanates may be made by mixing in appropriate relative amounts SUPRASEC® MPR (ex Huntsman), a 4,4'-diphenylmethane diisocyanate and SUPRASEC® 2185 (ex Huntsman), a polymeric MDI having an NCO value of 30.7% by weight comprising about 37.7% by weight of diisocyanate. Mixtures of SUPRASEC® 2185 and SUPRASEC® MI 20 (obtainable ex Huntsman), containing about 80 parts by weight of 4,4'-MDI and about 20 parts by weight of 2,4'-MDI and less than 2 parts by weight of 2,2'-MDI may also be used.

Use of a polyisocyanate having a functionality of 3 and more is beneficial in order to fabricate a polyurethane foam for use as plant growth substrate having high $pF_1$ values ($pF_1$ values>50%) because isocyanates having functionality of 3 and more lead to foams with relatively more closed pores (cell membranes) and have hence better water retention properties.

Prepolymers made of above mentioned polyisocyanates may be used. The prepolymer preferably has an NCO-value of 10-30% by weight and is made by reacting a polyisocyanate comprising 20-80% (preferably 25-55%) by weight of diphenylmethane diisocyanate (MDI) and 80-20% (preferably 75-45%) by weight of homologues of this diisocyanate, the homologues having an isocyanate functionality of 3 or more, the amounts both calculated on the amount of polyisocyanate, and a polyol having an average molecular weight of 62-7000 and an average nominal hydroxyl functionality of 2-6.

Polyols suitable for use in the polyisocyanate prepolymer have an average molecular weight of 62-7000 and an average nominal hydroxyl functionality of 2-6. Examples include ethylene glycol, diethylene glycol, triethylene glycol, propylene glycol, dipropylene glycol, tripropylene glycol, butanediol, glycerol, triethanolamine, trimethylolpropane, 1,2,6-hexanetriol, pentaerythritol, sorbitol, polyoxyethylene polyols, polyoxypropylene polyols, polyoxyethylene polyoxypropylene polyols and mixtures thereof. Preferred are polyols obtained by the polymerization of ethylene oxide and optionally propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane-dimethanol, glycerol, trimethylolpropane, 1,2,6-hexanetriol, pentaerythritol and sorbitol. Mixtures of initiators and/or cyclic oxides may be used. The polyoxyethylene-polyoxypropylene polyols are obtained by the simultaneous or sequential addition of ethylene and propylene oxides to initiators as fully described in the prior art. Random copolymers, block copolymers and combinations thereof may be used. Preferred ones are those having at least part and preferably all of the oxyethylene groups at the end of the polymer chain (capped or tipped). Mixtures of the said polyols may be used as well. Preferred polyols suitable for use in the polyisocyanate prepolymer are polyoxyethylene polyols and polyoxyethylene polyoxypropylene polyols having an average nominal hydroxyl functionality of 2-4 and most preferably of 3, an average molecular weight of 250-1000 and an oxyethylene content of at least 50% by weight, calculated on the weight of the polyol. Such polyols are commercially available. An example is Polyol 3380 ex Perstorp.

Also according to the invention part of polyol 1 and/or polyol 2 may be prereacted with all or part of the isocyanate. Part of polyol 1 and/or 2 may hence be used to make a polyisocyanate prepolymer composition. Therefore, a suitable prepolymer may be made by first reacting the polyisocyanate according to the invention with at least part of the first and/or second polyol.

The polyisocyanate prepolymers according to the invention are made in known manner by combining and mixing the polyisocyanate and the polyol and allowing them to react. The polyisocyanate and the polyol ratio is such that after the reaction a prepolymer is obtained having an NCO-value of 10-30% by weight. If desired a catalyst may be used which enhances the formation of urethane groups.

Preferably polyisocyanate prepolymers are used to make the foam according to the invention. Use of prepolymers may be beneficial towards formation of cross links in the polyurethane foam and a harder foam may be obtained in that case.

Polyols which may be used as first and second polyol include products obtained by the polymerisation of ethylene oxide and propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane, 1,2,6-hexanetriol, pentaerythritol and sorbitol. Mixtures of initiators may be used as well. The polyoxyethylene-polyoxypropylene polyols are obtained by the simultaneous or sequential addition of ethylene and propylene oxides to initiators as fully described in the prior art. Random copolymers, block copolymers and combinations thereof may be used having the indicated amount of oxyethylene groups.

The first polyether polyol used in the process for making the foam according to the invention has an average nominal hydroxy functionality of 2-6, an average molecular weight of 2000-12000 and an oxyethylene content of more than 50% weight calculated on the weight of this polyol.

According to some embodiments, the first polyether polyol used in the process for making the foam according to the invention preferably has an average nominal hydroxy functionality of 2-4 and more preferably of 3, an average molecular weight of 2000-8000 and more preferably of 3000-6000 and an oxyethylene content of more than 60% by weight calculated on the weight of this polyol.

According to some embodiments the unsaturation content of the first polyether polyol may be at most 0.03 meq/g, preferably at most 0.02 meq/g, more preferably at most 0.01 meq/g.

The second polyether polyol used in the process for making the foam according to the invention has an average nominal hydroxy functionality of 2-6, an average molecular weight of 2000-6000 and an oxyethylene content of 20-45% by weight calculated on the weight of this polyol.

According to some embodiments, the second polyether polyol used in the process for making the foam according to the invention preferably has an average nominal hydroxy functionality of 2-4 and more preferably of 3, an average molecular weight of 2000-4000 and an oxyethylene content of 20-35% by weight and more preferably of 25-30% by weight calculated on the total weight of this polyol.

According to some embodiments the oxyethylene groups in the first and second polyol are randomly distributed.

According to some embodiments the unsaturation content of the second polyether polyol may be at most 0.03 meq/g, preferably at most 0.02 meq/g, more preferably at most 0.01 meq/g.

According to some embodiments the weight ratio of the first polyol to the second polyol used in the process for making the foam according to the invention is ranging from 60:40 to 20:80, preferably ranging from 49:51 to 30:70.

According to some embodiments the weight ratio of the second polyether polyol used is preferably at least 50% calculated on the total weight of the first and second polyether polyol or in other words the weight ratio of the first and the second polyol used is ranging from 49:51 to 20:80, more preferably ranging from 49:51 to 30:70.

The total oxyethylene content is preferably lower than 50% by weight calculated on the total weight of the first and second polyether.

According to some embodiments the first and second polyether polyol may be first mixed to form a stable dispersion of polyether polyols before adding them to the polyisocyanate composition.

The average weight ratio of the oxyethylene content in the stable dispersion of polyether polyols is preferably less than 50% calculated on the weight of the dispersion.

The first and second polyether polyols are known in the art and/or commercially available. Examples of the first type of polyether polyols are Daltocel® F442, F444 and F555, all ex Huntsman and having an oxyethylene content of more than 60% by weight. An example of the second type of polyether polyol is Jeffol® G11-56 ex Huntsman Daltocel and Jeffol are trademarks of the Huntsman Corporation or an Affiliate thereof which has been registered in one or more but not all countries.

According to some embodiments, the process for making the foam according to the present invention is performed at an isocyanate index of 95-120, more preferably at an isocyanate index of 100-110.

Further isocyanate-reactive chain extenders and/or crosslinkers having an average molecular weight of 60-1999 may be added. Examples of such compounds are butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane, 1,2,6-hexanetriol, pentaerythritol, sorbitol and polyoxyethylene polyols, polyoxypropylene polyols, polyoxyethylene polyoxypropylene polyols and mixtures thereof having an average molecular weight of about 200, 600 and 1000 and mixtures of such compounds. The amount used of these chain extenders and/or crosslinkers is up to 20 and preferably up to 10 pbw per 100 pbw of the above polyether polyol mixture having an average molecular weight of 2000 and more.

Water may be added to the reaction in such an amount that the isocyanate index is in the range of 90-150 (preferably 95-120, more preferably 100-110). The amount of water (water content) used in the process according to the invention is preferably in the range of 2-7 pbw and more preferably in the range of 3.5-6 pbw.

Further a catalyst may be used which enhances the formation of urethane groups. Preferably it is used in an amount of 0.1-2% by weight (on all isocyanate reactive ingredients). Such catalysts are generally known in the art. Examples are amine catalysts, like triethylenediamine, N,N-dimethylethanolamine, bis (N,N-dimethylaminoethyl)ether, 2-(2-dimethylaminoethoxy)-ethanol, N,N,N'-trimethyl-N'-hydroxyethylbisaminoethyl-ether, N-(3-dimethylaminopropyl)-N,N-diisopropanolamine, N,N'-diethylpiperazine and 1-(bis(3-dimethyl-aminopropyl)amino-2-propanol and organometallic compounds like stannous octoate and dibutyltin dilaurate. Mixtures of catalysts may be used as well.

Optionally the foams may be made in the presence of additives and auxiliaries used in the polyurethanes art, like fire retardants, surfactants, other blowing agents, smoke-surpressants, colouring agents, carbon black, anti-microbial agents, anti-oxidants, mould release agents, fillers and fertilizers.

The foams are made by combining and mixing all ingredients and allowing the reaction to take place. The foams may be made according to a free rise process, a moulding process, a slabstock process, a lamination process or a spray process. When the foams are made in a mould, an overpack of at most 100%, preferably at most 50% is used. When using a moulding process, the foams may show an advantageous morphology: when two pieces of the same foam are placed upon each other, both saturated with water, then the lower piece will absorb less of the water from the upper foam than a prior art foam made without this overpack.

The ingredients may be fed independently to the mixing head of a foaming machine. Preferably the isocyanate reactive ingredients are premixed, optionally together with the additives and auxiliaries used in the polyurethanes art, before they are mixed with the polyisocyanate.

The foams obtained by the process of the present invention have an overall free-rise core density of at least 20 kg/m$^3$ and preferably of 20-50 kg/m$^3$, a resilience of at most 40% and preferably at most 30% and a volume increase at water saturation of at most 25% and preferably at most 20%.

The foams obtained by the process of the present invention preferably have a compression load deflection (CLD) at 40% which is at least 16 kPa, more preferably more than 20 kPa.

The foams obtained by the process of the present invention may have a compression load deflection (CLD) at 40% up to 200 kPa.

The foams obtained by the process of the present invention further have a water absorption, a level of air flow and cell openness which makes them in particular suitable for use as plant growth medium.

The foams obtained by the process of the present invention may be used in greenhouses for cultivating flowers, fruit, vegetables and other suitable vegetation as well as for cultivating suitable vegetation on green walls and greenroofs and other applications related to water economy management for plants.

For use in green houses the foam of the present invention may be further complemented by a drip irrigation system to which additional nutrients can be supplied.

For use in greenroofs and landscape coverage the foam of the present invention may be further complemented by a waterproof system based on pure polyurea (e.g. Tecnocoat P-2049).

For use in greenroofs the foams obtained by the present invention may improve the isolation of the covering of a building. An additional layer of thermal insulation may further improve the energy efficiency and may reduce the costs of heating and refrigeration up to 5%.

Furthermore the use of the foam of the present invention in greenroofs, green walls and landscape coverage may reduce the acoustic contamination thanks to the muffling of the sound and it will diminish the number of "hard" surfaces available for the reverberation of the sound.

The hydrophilic substrate foam of the present invention is characterized by the ability to very efficient manage and retain water. The foam may be used in various thicknesses and profiles to meet the end user final requirements.

The main advantages of the foam of the present invention compared to existing plant (cultivating) substrates are:

The foam of the present invention can hold up to 30 times its weight in water with limited swelling (<25%).

The foam of the present invention has water retention characteristics which are comparable to natural plant growth media such as soil.

The foam of the present invention can drain sufficiently the overload of water while more than 65% of the water is retained in the foam.

The foam of the present invention is easy to handle and install (various thicknesses and profiles can be configured in order to meet the end user final requirements).

Due to its light weight (20-50 kg/m$^3$), the foam of the present invention is ideally suitable for greenroofs on older buildings with weak structural properties.

The use of the foam of the present invention may improve building insulation and hence reduce heating and cooling costs by up to 5%.

In the context of the present application the following terms have the following meaning:
1) isocyanate index or NCO index or index:
   the ratio of NCO-groups over isocyanate-reactive hydrogen atoms present in a formulation, given as a percentage:

$$\frac{[NCO] \times 100}{[\text{active hydrogen}]} \, (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients used in that reaction step. Only the free isocyanate groups and the free isocyanate-reactive hydrogens (including those of the water) present at the actual foaming stage are taken into account.

Water index is the ratio 100Y/X (%) wherein Y is the amount of water in grams actually used in a formulation and X is the total amount of water in grams theoretically needed in the same formulation so as to obtain an isocyanate index of 100.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water. This means that for the purpose of calculating the isocyanate index at the actual foaming process one hydroxyl group is considered to comprise one reactive hydrogen and one water molecule is considered to comprise two active hydrogens.

3) The expression "polyurethane foams" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-polyurethane foams).

4) The term "nominal hydroxyl functionality" or "nominal functionality" or "hydroxyl functionality" is used herein to indicate the functionality (number of hydroxyl groups per molecule) of the polyol composition on the assumption that this is the functionality (number of active hydrogen atoms per molecule) of the initiator(s) used in their preparation although in practice it will often be somewhat less because of some terminal unsaturation. The term "equivalent weight" refers to the molecular weight per isocyanate reactive hydrogen atom in the molecule.

5) The word "average" refers to "number average".

6) Density is measured on foam samples made under atmospheric conditions without use of auxiliary blowing agents and according to ISO 845.

7) Hardness CLD: compression load deflection at 40% measured according to ISO 3386/1 with the proviso that the hardness is measured on dry and non-crushed samples during the first cycle.

8) Foam swelling $\Delta V$ is the volume increase of foam samples at 100% water saturation, in %:

$$\Delta V = \frac{V_1 - V_2}{V_2} \times 100(\%)$$

wherein $V_2$ is the volume of the foam without water intake and $V_1$ is the volume of the foam at maximal water absorption both at 23° C. and 50% relative humidity. In order to determine $V_1$, the foam is immersed in water for 24 h at ambient pressure and 23° C.

9) Resilience is measured according to ISO 8307 with the proviso that the resilience is measured on dry and non-crushed samples.

10) Water retention values are measured in this invention by means of pF values. In the context of the invention pF values correspond to water volumes retained in the foam after immersing a foam sample in water for a predefined period to achieve a water saturated foam sample and then subjecting the water saturated foam to different under pressures for a predefined period. In a pF curve the measured volumetric water content retained in the foam is plotted on the Y-axis, against the applied under pressure on the (negative) X-axis. On the pF curve a $pF_0$ value corresponds to a volume of water retained in a water saturated foam sample after subjecting said foam sample for a predefined period to a pressure of 0 cm $H_2O$ column. On the pF curve a $pF_1$ value corresponds to a volume of water retained in a water saturated foam sample after subjecting said foam sample for a predefined period to a pressure of $-10$ cm $H_2O$ column. On the pF curve a $pF_{1.5}$ value corresponds to a volume of water retained in a water saturated foam sample after subjecting said foam sample for a predefined period to a pressure of $-32$ cm $H_2O$ column.

$pF_0$ and $pF_1$ values taken from the pF curve are suitable to calculate the water retention and hence availability of water in a polyurethane foam. $pF_0$ and $pF_1$ are further defined as $$pF_0 = \frac{V_u}{V_f} \times 100(\%)$$

$$pF_1 = \frac{V_{r-1}}{V_f} \times 100(\%)$$

wherein $V_f$ is the initial volume (in ml) of a (dry) foam sample, $V_u$ is the water uptake (meaning the volume of water retained in a water saturated foam sample after subjecting said foam sample for a predefined period to a pressure of 0 cm $H_2O$ column) in ml of the foam sample when saturated with water and $V_{r-1}$ is the volume of the water retained in ml after subjecting the water saturated foam sample to a pressure of $-10$ cm $H_2O$ column for a predefined period.

$V_f$, $V_u$ and $V_{r-1}$ are determined as follows: a foam sample is cut to obtain indicated dimensions such as 100×120×75 mm or 100×120×60 mm (length×width×height). Hence $V_f$ of the sample is 900 ml or 720 ml. The dry weight of the foam sample is determined at 105° C. Then the foam sample is immersed for a predefined period of 6 hours at atmospheric pressure and 23° C. in a water bath in such a way that 1 cm of the sample in the height direction extends above the water surface.

Then the sample is immersed completely in the water bath for 18 hours at atmospheric pressure and 23° C. Subsequently the sample is placed on a sieve with a mesh of 0.5-1 cm at the same pressure and temperature and allowed to release water for 30 minutes. Finally the weight of the foam sample (containing the remaining water) is determined again and $V_u$ is calculated, assuming a density of the $H_2O$ of 1 kg/dm$^3$.

Then the water saturated sample is placed for 24 h in a closed environment at 23° C. and a sub-atmospheric pressure is applied to the bottom surface of the sample (for example to a pressure of $-10$ cm $H_2O$ column measured from the half height of the foam sample in order to measure $pF_1$).

Finally the weight of the sample is determined again and the volume $V_{r-1}$ of water retained in the sample is calculated (assuming a water density of 1 kg/dm$^3$).

A device which may be used to measure pF values and suitable to create a sub-atmospheric environment on the bottom surface of the sample is a so-called Sandbox obtainable from the Dutch firm Eijkelkamp (www.eijkelkamp.com) and is used for pF-determinations.

Calculation of the water content on volume basis is also described in ISO 11274 for soil samples after subjecting the soil samples to a metric pressure (see section 5.5) and can also be applied to calculate the water content in the foam samples of the present invention. The metric pressure refers here to the applied under pressure in cm $H_2O$ column.

11) Water buffer capacity (WBC, %) may be defined as $pF_0$-$pF_{1.5}$ (also referred to in prior art as $\phi_0$-$\phi_{32}$), wherein $$pF_0 = \Phi_0 = \frac{V_u}{V_f} \times 100(\%)$$

and $$pF_{1.5} = \Phi_{32} = \frac{V_{r-1.5}}{V_f} \times 100(\%),$$

and
wherein $V_f$ is the initial volume (in ml) of a (dry) foam sample, $V_u$ is the water uptake (in ml) of the foam sample when saturated with water and $V_{r-1.5}$ is the volume of the water retained after subjecting the water saturated foam sample to a pressure of −32 cm $H_2O$ column for a predefined period in ml. $V_f$, $V_u$ and $V_{r-1.5}$ are determined as described in 10)

12) The unsaturation of the polyol mixture which is used in the process according to the present invention, expressed in meq/g (milli-equivalents of unsaturated groups per gram of polyol), is determined by ISO 17710.

The invention is further illustrated with the following examples.

EXAMPLES 1-8

Foams were made by allowing the indicated formulations to react under free rise conditions (except example 6 which compares moulded versus free rise samples).

Following ingredients are used:

Polyisocyanate 1: a prepolymer having an NCO value of 26.82% by weight, prepared by reacting 93 pbw of Suprasec® 2185 ex Huntsman and 7 pbw of Perstorp's P3380 a trimethylolpropane initiated polyoxyethylene polyol having an OH value of 382 mg KOH/g. This prepolymer is in particular very suitable for the production of substrate foam with a $pF_1$ value of >70% for use in propagation blocks.

Polyisocyanate 2 is a prepolymer obtained by reacting 54 pbw of Suprasec® 2185 and 36 pbw Suprasec® MPR and 10 pbw of Polyol 3380 (a polyoxyethylene triol ex Perstorp having an OH value of 382 mg KOH/g) and having an NCO value of about 25.9% by weight. This prepolymer is in particular very suitable for the production of substrate foam with a $pF_1$ value in the range of 10-60% for use in cultivation mats.

Polyisocyanate 3 is Suprasec® 2185 ex Huntsman (no prepolymer).

Polyisocyanate 4 is a prepolymer obtained by reacting 30 pbw of 4,4'MDI and 70 pbw of a triol initiated polyoxyethylene having random oxyethylene and oxypropylene residues with 75% by weight oxyethylene content. The prepolymer having an NCO value of about 7.85% by weight.

Polyol 1: Daltocel® F555, a polyether polyol ex Huntsman having an OH value of about 28 mg KOH/g, an oxyethylene content of about 77% by weight (on polyol). Polyol 1 is suitable for use as the first polyether polyol as referred to in this invention.

Polyol 2: Jeffol® G 11-56 (also similar to commercial available Daltocel® F450, a polyether polyol ex Huntsman), a polyoxyethylene polyoxypropylene polyol having an OH value of about 56 mg KOH/g, an oxyethylene content in the range 25-30% by weight (on polyol) and an average molecular weight of about 3000. Polyol 2 is suitable for use as the second polyether polyol as referred to in this invention.

Polyol 3: Daltocel® F442, a polyether polyol ex Huntsman having a nominal functionality of 3, an OH value of about 42 mg KOH/g and comprising oxyethylene and oxypropylene groups, the amount of oxyethylene groups being about 75% by weight (on polyol). Polyol 3 is suitable for use as the first polyether polyol as referred to in this invention.

Polyol 4: Daltocel® F489, a polyether polyol ex Huntsman having a nominal functionality of 3, an OH value of about 28 mg KOH/g and comprising oxyethylene and oxypropylene groups, the amount of oxyethylene groups being about 27.5% by weight (on polyol).

Catalyst 1: Jeffcat® DPA ex Huntsman
Catalyst 2: Jeffcat® ZF-10, ex Huntsman.
Surfactant 1: Tegostab® B8724LF, ex Evonik
Surfactant 2: Dabco® DC198, ex Air Products
Suprasec, Daltocel, Jeffol and Jeffcat are trademarks of the Huntsman Corporation or an Affiliate thereof which have been registered in one or more but not all countries.

The foams were subjected to physical tests in order to determine the density, the resilience, the hardness (CLD), the dimensional foam stability or swelling (ΔV), water retention values ($pF_0$, $pF_{0.7}$, $pF_1$, $pF_{1.5}$, $pF_2$). The water retention values are measured on non-crushed foam samples having dimensions 100×120×75 mm unless otherwise indicated.

Amounts in the formulations are always given in parts by weight (pbw).

Example 1: Comparison with State of the Art Plant Substrate Foams Made of Polyurethane and Fabricated at Low Isocyanate Index In Table 1 foams 1 and 2 are state of the art plant substrate foams made of polyurethane and fabricated at low isocyanate index. Foams 1 and 2 are hence comparative examples, Foams 3 and 4 are according to the invention. Foam 1 was first crushed before performing pF measurements in order to open the cells in the foam (otherwise the foam is too closed and will not absorb water), foams 2, 3 and 4 do not need to be crushed beforehand.

Example 2: Water Retention Values

In Table 2 foams 5 and 6 are state of the art plant substrate foams made of polyurethane and fabricated at low isocyanate index. Rockwool is a commercial available plant growth substrate based on mineral fibers. Rockwool, Foams 5 and 6 are hence comparative examples, foams 7 and 8 are according to the invention and are produced on a low pressure dispensing machine. Foam 5 (comparable to prior art foam 1 in example 1) was first crushed before performing pF measurements in order to open the cells in the foam (otherwise the foam is too closed and will not absorb water).

Figure 2B:
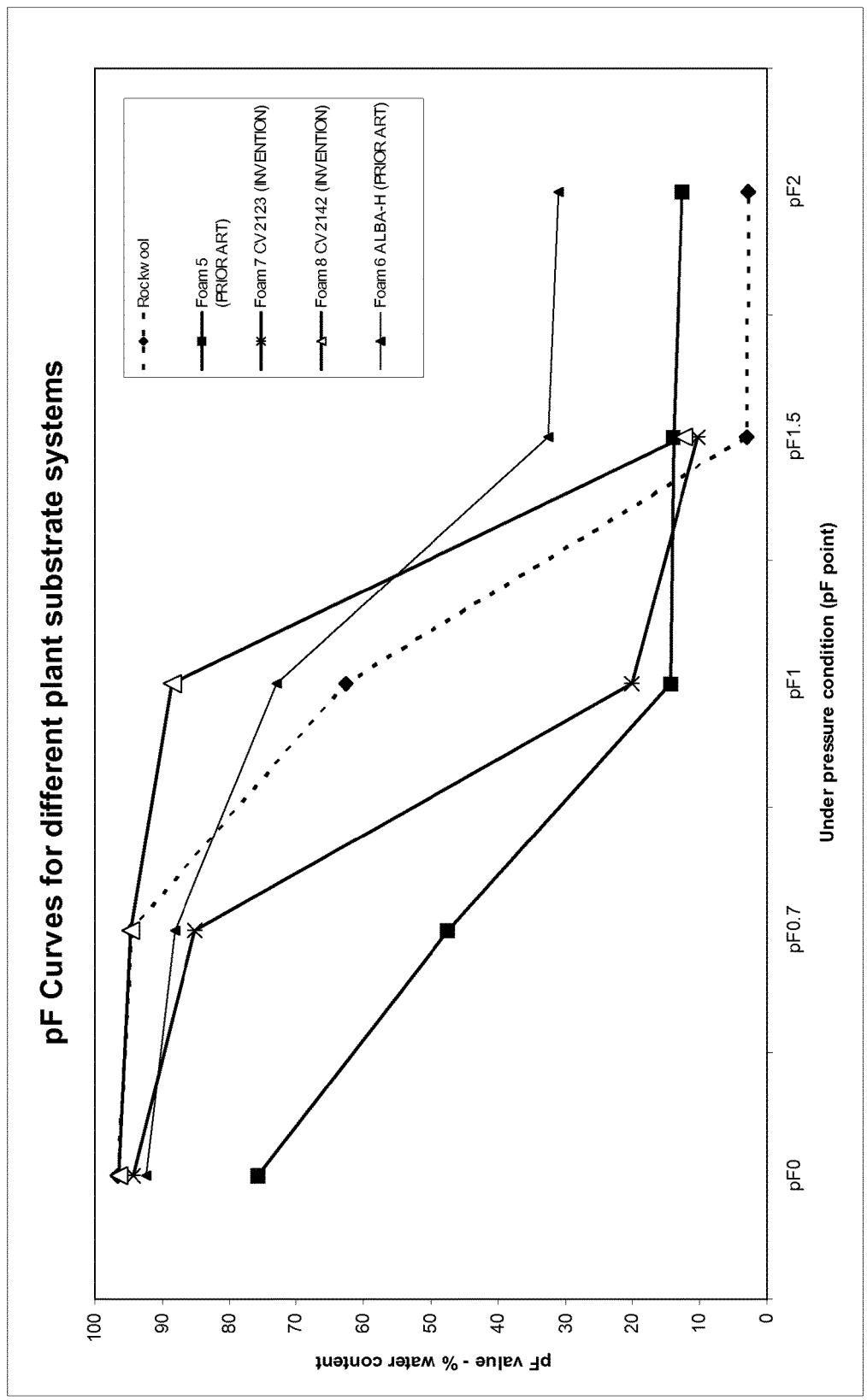
FIG. 2B illustrates the pF characteristics of the plant substrates referred to in Table 2.

FIG. 2B illustrates the pF curve for the plant substrates referred to in Table 2. The pF values are measured on samples having dimensions 100×100×60 mm (length× width×height). For foam 5 the pF data in FIG. 2B are originating from crushed samples.

Example 3: Effect of Polyether Polyol Ratios and Composition Used to Fabricate the Polyurethane Foams According to the Invention In Table 3 foams 9-17 are foams made of polyurethane and fabricated using the reactive ingredients according to the invention but at different ratios of polyisocyanate reactive ingredients (polyether polyols). Foams 10, 11, 12, 13 and 14 are produced using the formulations (ratios) according to the invention, foams 9, 15, 16 and 17 are produced using different ratios and are hence comparative examples. Foam 9 has a too low $pF_0$ value and hence no good water retention for plant growth, foams 16 and 17 collapsed and foam 15 had a more coarse cell structure.

Example 4: Effect of Water Content in Process Used to Fabricate the Polyurethane Foams According to the Invention In Table 4 all foams are fabricated according to the invention using the same isocyanate composition and at an identical isocyanate index of 110. Foams 18, 20 and 22 are foams made with 5.5 pbw water and foams 19, 21 and 23 are foams made with 6.5 pbw water. Foams fabricated using a higher amount of water lead to foams having less swelling.

Example 5: Effect of Isocyanate Composition in Process Used to Fabricate the Polyurethane Foams According to the Invention In Table 5 all foams are fabricated according to the invention using the same polyether polyol composition but with a different isocyanate composition. Foams 24, 25, 27 and 28 are foams made using a polyisocyanate prepolymer. Foams 26 and 29 are foams made with a polyisocyanate composition which is not a prepolymer. Foams fabricated using a prepolymer isocyanate have a higher hardness. Foams made using a prepolymer isocyanate composition are better for fabricating plant growth media for seedlings due to their better water retention capability ($pF_1$ values).

Example 6: Effect of Moulding During the Fabrication of the Polyurethane Foams According to the Invention In Table 6 all foams are fabricated using the same formulations (according to the invention). The amount of overpack was 0% (no moulding, free rise process), 30%, 45% and 55%.

Example 7: Typical Formulation Used to Fabricate the Foams According to the Invention and Suitable as Plant Growth Media In Table 7 typical formulations are shown which are suitable for fabricating the foams according to the invention. Foams 34-39 have all very good water retention values and are very suitable for use as plant growth media. The high $pF_1$ value ($pF_1$>50%) makes these foams in particular suitable for growing seedlings (high demand of water). The foams in Table 7 are produced on a large scale low pressure dispensing machine (which could result in a slightly more "open cell" foam compared to hand-mixed lab-scale foams).

Example 8: Growth Results

Cucumber seeds were allowed to grow in comparative foam 1 as well as in foams 7 and 8 which are according to the invention (see Table 2 for formulations). After 21 days the plants were cut off above the substrate foam and then the weight of the plants was determined (see Table 8). Foams according to the invention give plants with significant increased plant weight compared to plants grown on comparative foam 1.

TABLE 1

Comparison state of the art plant substrate foams made of PU and fabricated at low NCO index

| Example | Foam 1 28012-1-17 | Foam 2 HM 130511-1 | Foam 3 VM250811-8 | Foam 4 VM250811-9 |
|---|---|---|---|---|
| Polyisocyanate 1, pbw | — | — | 92.1 | — |
| Polyisocyanate 2, pbw | 38.4 | — | — | 95.1 |
| Polyisocyanate 4, pbw | — | 100 | — | — |
| Polyol 1 (F555), pbw | — | — | 37 | 37 |
| Polyol 2 (Jeffol ® G11-56), pbw | — | — | 60 | 60 |
| Polyol 3 (F442), pbw | 7.9 | — | — | — |
| Polyol 4 (F489), pbw | 48 | — | — | — |
| Catalyst 1, pbw | 0.3 | — | 1 | 1 |
| Catalyst 2, pbw | 0.02 | — | 0.1 | 0.1 |
| Surfactant 1, pbw | 0.25 | — | — | — |
| Surfactant 2, pbw | — | — | 2 | 2 |
| Water, pbw | 5.1 | 30 | — | — |
| Isocyanate index | 39 | 6 | 100 | 100 |
| Water index | 280 | 1773 | 100 | 100 |
| Resilience, % | 25.4 | 43.2 | 14.9 | 15.2 |
| Density, not crushed, kg/m³ | 33.7 | 74 | 37 | 31.4 |
| CLD at 40%, non-crushed, dry, kPa | 11.25 | 3.4 | 50.86 | 33.07 |
| ΔV, not crushed, % | 12.98 | 71 | 13.63 | 15.43 |
| $pF_0$, non-crushed, % | 41.5 | 92.3 | 85 | 88 |
| $pF_0$, crushed, % | 76 | — | — | — |
| $pF_{0.7}$, non-crushed, % | 40.8 | 88 | 82 | 82 |
| $pF_{0.7}$, crushed, % | 47 | — | — | — |
| $pF_1$, not-crushed, % | 38.8 | 72.8 | 75 | 49 |
| $pF_1$, crushed, % | 14 | — | — | — |
| $pF_{1.5}$, not-crushed, % | 38.7 | 32.4 | 21 | 13 |
| $pF_{1.5}$, crushed, % | 14 | — | — | — |
| $pF_2$, non-crushed, % | 38.4 | 31.2 | 20 | 13 |
| $pF_2$, crushed, % | 13 | — | — | — |

TABLE 1-continued

Comparison state of the art plant substrate foams made of PU and fabricated at low NCO index

| Example | Foam 1 28012-1-17 | Foam 2 HM 130511-1 | Foam 3 VM250811-8 | Foam 4 VM250811-9 |
|---|---|---|---|---|
| WBC ($pF_0$-$pF_{1.5}$), not-crushed, % | 2.8 | 59.9 | 64 | 75 |
| WBC ($pF_0$-$pF_{1.5}$), crushed, % | 69.9 | — | — | — |

(—) means not present or measured

TABLE 2 pF values for different plant growth substrates.

| Example | Rockwool | Foam 5 28012-1-17 | Foam 6 HM130511-1 | Foam 7 CV2123 | Foam 8 CV2142 |
|---|---|---|---|---|---|
| Polyisocyanate 1, pbw | — | — | — | — | 102.5 |
| Polyisocyanate 2, pbw | — | 38.4 | — | 114.6 | — |
| Polyisocyanate 4, pbw | — | — | 100 | — | — |
| Polyol 1 (F555), pbw | — | — | — | 37 | 37 |
| Polyol 2 (Jeffol ® G11-56), pbw | — | — | — | 60 | 60 |
| Polyol 3 (F442), pbw | — | 7.9 | — | — | — |
| Polyol 4 (F489), pbw | — | 48 | — | — | — |
| Catalyst 1, pbw | — | 0.3 | — | 1 | 1 |
| Catalyst 2, pbw | — | 0.02 | — | 0.2 | 0.2 |
| Surfactant 1, pbw | — | 0.25 | — | — | — |
| Surfactant 2, pbw | — | — | — | 2 | 2 |
| Water, pbw | — | 5.1 | 30 | 4.5 | 4.5 |
| Isocyanate index | — | 39 | 6 | 120 | 110 |
| Water index | — | 280 | 1773 | — | — |
| Resilience, % | — | 25.4 | 43.2 | 18 | 22.1 |
| Density, not crushed, kg/m³ | — | 33.7 | 74 | 29.1 | 29.3 |
| CLD at 40%, non-crushed, dry, kPa | — | 11.25 | 3.4 | 24.8 | 41.7 |
| ΔV, not crushed, % | — | 12.98 | 71 | 16.4 | 10.9 |
| $pF_0$, not crushed, % | 96 | 41.5 | 92.3 | 94 | 96 |
| $pF_0$, crushed, % | — | 76 | — | — | — |
| $pF_{0.7}$, not crushed, % | 94 | 40.8 | 88 | 85 | 95 |
| $pF_{0.7}$, crushed, % | — | 47 | — | — | — |
| $pF_1$, not crushed, % | 63 | 38.8 | 72.8 | 20 | 88 |
| $pF_1$, not-crushed, % | — | 14 | — | — | — |
| $pF_{1.5}$, not crushed, % | 3 | 38.7 | 32.4 | 10 | 12 |
| $pF_{1.5}$, crushed, % | — | 14 | — | — | — |
| $pF_2$, not crushed, % | 3 | 38.4 | 31 | — | — |
| $pF_2$, crushed, % | — | 13 | — | — | — |
| WBC ($pF_0$-$pF_{1.5}$), not-crushed, % | 89 | 2.8 | 59.9 | 84 | 83.86 |
| WBC ($pF_0$-$pF_{1.5}$), crushed, % | — | 69.9 | — | — | — |

(—) means not present or measured

TABLE 3

Effect of polyether polyol ratio

| | Foam nr | | | | |
|---|---|---|---|---|---|
| | Foam 9 VM120811-3 | Foam 10 VM120811-4 | Foam 11 VM170811-1 | Foam 12 VM120811-2 | Foam 13 VM190811-1 |
| Polyisocyanate 1, pbw | — | — | — | — | — |
| Polyisocyanate 2, pbw | 107.5 | 106.6 | 105.7 | 104.8 | 104 |
| Polyol 1 (F555), pbw | 10 | 20 | 30 | 40 | 50 |
| Polyol 2 (Jeffol ® G11-56), pbw | 90 | 80 | 70 | 60 | 50 |
| Polyol 3 (F442), pbw | — | — | — | — | — |
| Polyol 4 (F489), pbw | — | — | — | — | — |
| Catalyst 1, pbw | 1 | 1 | 1 | 1 | 1 |
| Catalyst 2, pbw | 0.1 | 0.1 | 0.1 | 0.1 | 0.1 |
| Surfactant 1, pbw | — | — | — | — | — |
| Surfactant 2, pbw | 2 | 2 | 2 | 2 | 2 |
| Water, pbw | 4.5 | 4.5 | 4.5 | 4.5 | 4.5 |
| Isocyanate index | 110 | 110 | 110 | 110 | 110 |
| Water index | 89.2 | 89.3 | 89.4 | 89.4 | 89.0 |
| Resilience | 16 | 16.5 | 16.6 | 16 | 15.7 |
| Density, not crushed, kg/m³ | 26.7 | 28.6 | 31.6 | 33 | 34.3 |

TABLE 3-continued

Effect of polyether polyol ratio

| | | | | | |
|---|---|---|---|---|---|
| CLD at 40%, not-crushed, dry, kPa | 28.9 | 26.0 | 42.2 | 41.0 | 39.5 |
| ΔV, not crushed, % | 8.4 | 7.0 | 9.1 | 12.0 | 14.8 |
| $pF_0$, not-crushed, % | 43 | 72.5 | 91.5 | 87.1 | 85 |
| $pF_{0.7}$, not-crushed, % | — | 71.6 | 88.9 | 73.9 | 73.2 |
| $pF_1$, not-crushed, % | 27.8 | 69.0 | 68.8 | 25 | 19 |
| $pF_{1.5}$, not-crushed, % | — | 26.0 | 13.7 | 11.6 | 13.4 |
| $pF_2$, not-crushed, % | — | 24.3 | 13.8 | 11.5 | 13.3 |
| WBC ($pF_0 - pF_{1.5}$), not-crushed, % | — | 46.5 | 78 | 76 | 72 |

| | Foam nr | | | |
|---|---|---|---|---|
| | Foam 14 VM190811-2 | Foam 15 VM190811-3 | Foam 16 VM190811-4 | Foam 17 VM190811-5 |
| Polyisocyanate 1, pbw | — | — | — | — |
| Polyisocyanate 2, pbw | 103.1 | 102.2 | 101.3 | 100.4 |
| Polyol 1 (F555), pbw | 60 | 70 | 80 | 90 |
| Polyol 2 (Jeffol ® G11-56), pbw | 40 | 30 | 20 | 10 |
| Polyol 3 (F442), pbw | — | — | — | — |
| Polyol 4 (F489), pbw | — | — | — | — |
| Catalyst 1, pbw | 1 | 1 | 1 | 1 |
| Catalyst 2, pbw | 0.1 | 0.1 | 0.1 | 0.1 |
| Surfactant 1, pbw | — | — | — | — |
| Surfactant 2, pbw | 2 | 2 | 2 | 2 |
| Water, pbw | 4.5 | 4.5 | 4.5 | 4.5 |
| Isocyanate index | 110 | 110 | 110 | 110 |
| Water index | 89.6 | 89.7 | 89.8 | 89.8 |
| Resilience | 16.9 | **16.4 | * | * |
| Density, not crushed, kg/m³ | 36 | **38.7 | * | * |
| CLD at 40%, not-crushed, dry, kPa | 33.6 | **30.8 | * | * |
| ΔV, not crushed, % | 16.3 | **22.2 | * | * |
| $pF_0$, not-crushed, % | 76.1 | **56 | * | * |
| $pF_{0.7}$, not-crushed, % | 64.5 | ** | * | * |
| $pF_1$, not-crushed, % | 22.1 | ** | * | * |
| $pF_{1.5}$, not-crushed, % | 20.8 | ** | * | * |
| $pF_2$, not-crushed, % | 20.2 | ** | * | * |
| WBC ($pF_0 - pF_{1.5}$), not-crushed, % | 55 | ** | * | * |

(*) means foams collapsed
(**) means foam has coarse cell structure,
(—) means not present or measured

TABLE 4

Effect of water content

| | Foam nr | | | | | |
|---|---|---|---|---|---|---|
| | Foam 18 VM240811-4 | Foam 19 VM240811-5 | Foam 20 VM240811-6 | Foam 21 VM250811-1 | Foam 22 VM250811-4 | Foam 23 VM250811-5 |
| Polyisocyanate 1, pbw | — | — | — | — | — | — |
| Polyisocyanate 2, pbw | 125.5 | 145.2 | 124.6 | 144.4 | 122.8 | 142.6 |
| Polyol 1 (F555), pbw | 30 | 30 | 40 | 40 | 60 | 60 |
| Polyol 2 (Jeffol ® G11-56), pbw | 70 | 70 | 60 | 60 | 40 | 40 |
| Polyol 3 (F442), pbw | — | — | — | — | — | — |
| Polyol 4 (F489), pbw | — | — | — | — | — | — |
| Catalyst 1, pbw | 1 | 1 | 1 | 1 | 1 | 1 |
| Catalyst 2, pbw | 0.2 | 0.2 | 0.2 | 0.2 | 0.2 | 0.2 |
| Surfactant 1, pbw | — | — | — | — | — | — |
| Surfactant 2, pbw | 2 | 2 | 2 | 2 | 2 | 2 |
| Water, pbw | 5.5 | 6.5 | 5.5 | 6.5 | 5.5 | 6.5 |
| Isocyanate index | 110 | 110 | 110 | 110 | 110 | 110 |
| Water index | 89.6 | 89.8 | 89.7 | 89.9 | 89.8 | 90 |
| Resilience | 13.0 | 10.9 | 15.2 | 14.1 | 17.4 | 18.5 |
| Density, not crushed, kg/m³ | 24.6 | 22.5 | 25.8 | 23.1 | 26.9 | 23.6 |
| CLD at 40%, not-crushed, dry, kPa | 47.0 | 67.8 | 39.6 | 56.1 | 50.7 | 58.1 |
| ΔV, not crushed, % | 7.9 | 5.7 | 8.5 | 6.1 | 12.8 | 10.4 |

TABLE 4-continued

Effect of water content

| | Foam 18 VM240811-4 | Foam 19 VM240811-5 | Foam 20 VM240811-6 | Foam 21 VM250811-1 | Foam 22 VM250811-4 | Foam 23 VM250811-5 |
|---|---|---|---|---|---|---|
| $pF_0$, not-crushed, % | 74.7 | 71.9 | 89.3 | 78.1 | 80.8 | 73.2 |
| $pF_{0.7}$, not-crushed, % | 73.2 | 70.5 | 87.7 | 76.5 | 78.5 | 68.2 |
| $pF_1$, not-crushed, % | 61.6 | 64.9 | 40.9 | 61.7 | 59.1 | 48.6 |
| $pF_{1.5}$, not-crushed, % | 12.7 | 21.3 | 10.4 | 14.3 | 18.5 | 19.5 |
| $pF_2$, not-crushed, % | 12.2 | 20.8 | 10.1 | 13.5 | 17.7 | 17.8 |
| WBC ($pF_0 - pF_{1.5}$), not-crushed, % | 62.0 | 50.6 | 78.9 | 63.8 | 62.3 | 53.7 |

(—) means not present or not measured

TABLE 5

Effect of polyisocyanate composition

| | Foam 24 VM250811-8 | Foam 25 VM250811-9 | Foam 26 VM250811-10 | Foam 27 VM250811-11 | Foam 28 VM250811-12 | Foam 29 VM250811-13 |
|---|---|---|---|---|---|---|
| Polyisocyanate 1, pbw | 92.1 | — | — | 101.3 | — | — |
| Polyisocyanate 2, pbw | — | 95.1 | — | — | 104.6 | — |
| Polyisocyanate 3, pbw | — | — | 80.4 | — | — | 88.5 |
| Polyol 1 (F555), pbw | 37 | 37 | 37 | 37 | 37 | 37 |
| Polyol 2 (Jeffol ® G11-56), pbw | 60 | 60 | 60 | 60 | 60 | 60 |
| Polyol 3 (F442), pbw | — | — | — | — | — | — |
| Polyol 4 (F489), pbw | — | — | — | — | — | — |
| Catalyst 1, pbw | 1 | 1 | 1 | 1 | 1 | 1 |
| Catalyst 2, pbw | 0.1 | 0.1 | 0.1 | 0.1 | 0.1 | 0.1 |
| Surfactant 1, pbw | — | — | — | — | — | — |
| Surfactant 2, pbw | 2 | 2 | 2 | 2 | 2 | 2 |
| Water, pbw | 4.5 | 4.5 | 4.5 | 4.5 | 4.5 | 4.5 |
| Isocyanate index | 100 | 100 | 100 | 110 | 110 | 110 |
| Water index | 100 | 100 | 100 | 89.5 | 89.5 | 89.5 |
| Resilience | 13.3 | 14.9 | 22.3 | 11 | 15.2 | 16.9 |
| Density, not crushed, kg/m³ | 37 | 31.4 | 27.6 | 37 | 31.8 | 28.4 |
| CLD at 40%, non-crushed, dry, kPa | 50.86 | 33.07 | 22.28 | 67.76 | 42.99 | 30.5 |
| ΔV, not crushed, % | 14.2 | 16.3 | 14.9 | 11.8 | 9.3 | 11.4 |
| $pF_0$, not-crushed, % | 91.3 | 87.1 | 83.5 | 86.7 | 84.5 | 85.4 |
| $pF_{0.7}$, not-crushed, % | 91.3 | 85 | 75 | 85.4 | 81.4 | 82.2 |
| $pF_1$, not-crushed, % | 85 | 40.5 | 20 | 82.7 | 43.7 | 33.4 |
| $pFL_{1.5}$, not-crushed, % | 12.4 | 10.9 | 7 | 14.1 | 12.1 | 9.1 |
| $pF_2$, not-crushed, % | 12.2 | 10.8 | 6.8 | 13.9 | 11.9 | 8.9 |
| WBC ($pF_0 - pF_{1.5}$), not-crushed, % | 78.9 | 76.2 | 76.5 | 72.6 | 72.4 | 76.3 |

(—) means not present or not measured

TABLE 6

Effect of moulding on foam characteristics

| Foam nr | Foam 30 280912-1 | Foam 31 VM190912-2 | Foam 32 VM190912-5 | Foam 33 VM190912-4 |
|---|---|---|---|---|
| Overpack, % | No moulding | 30 | 45 | 55 |
| Polyisocyanate 1, pbw | — | — | — | — |
| Polyisocyanate 2, pbw | 95.1 | 95.1 | 95.1 | 95.1 |
| Polyisocyanate 3, pbw | — | — | — | — |
| Polyol 1 (F555), pbw | 37 | 37 | 37 | 37 |
| Polyol 2 (Jeffol ® G11-56), pbw | 60 | 60 | 60 | 60 |
| Polyol 3 (F442), pbw | — | — | — | — |
| Polyol 4 (F489), pbw | — | — | — | — |
| Catalyst 1, pbw | 1 | 1 | 1 | 1 |
| Catalyst 2, pbw | 0.1 | 0.1 | 0.1 | 0.1 |
| Surfactant 1, pbw | — | — | — | — |
| Surfactant 2, pbw | 2 | 2 | 1.5 | 1.5 |
| Water, pbw | 4.5 | 4.5 | 4.5 | 4.5 |
| Isocyanate index | 100 | 100 | 100 | 100 |
| Resilience | 16.6 | 22.5 | 21.0 | 19.5 |
| Density, not crushed, kg/m³ | 32.9 | 39.1 | 43.4 | 46.5 |

TABLE 6-continued

Effect of moulding on foam characteristics

| Foam nr | Foam 30 280912-1 | Foam 31 VM190912-2 | Foam 32 VM190912-5 | Foam 33 VM190912-4 |
|---|---|---|---|---|
| CLD at 40%, non-crushed, dry, kPa | 35.1 | 48.2 | 68.2 | 75.4 |
| ΔV, not crushed, % | 14.0 | 17.1 | 18.3 | 21.7 |
| $pF_0$, not-crushed, % | 84.3 | 75.6 | 77.8 | 74.1 |
| $pF_{0.7}$, not-crushed, % | 80.2 | 72.6 | 76.2 | 73.0 |
| $pF_1$, not-crushed, % | 38.8 | 57.8 | 67.2 | 65.8 |
| $pF_{1.5}$, not-crushed, % | 9.7 | 12.6 | 13.9 | 13.9 |

(—) means not present or not measured

TABLE 7

Typical formulations suitable for fabricating the foam according to the invention (plant growth media).

| | Foam nr | | | | | |
|---|---|---|---|---|---|---|
| | Foam 34 CV2128 | Foam 35 CV2129 | Foam 36 CV2130 | Foam 37 CV2120 | Foam 38 CV2144 | Foam 39 CV2123 |
| Overpack, % | No | No | No | No | No | No |
| Polyisocyanate 1, pbw | 92.0 | 101.4 | 110.6 | — | — | — |
| Polyisocyanate 2, pbw | — | — | — | 95.2 | 104.7 | 114.2 |
| Polyol 1 (F555), pbw | 37 | 37 | 37 | 37 | 37 | 37 |
| Polyol 2 (Jeffol ® G11-56), pbw | 60 | 60 | 60 | 60 | 60 | 60 |
| Catalyst 1, pbw | 1 | 1 | 1 | 1 | 1 | 1 |
| Catalyst 2, pbw | — | — | 0.2 | — | 0.2 | 0.2 |
| Surfactant 2, pbw | 2 | 2 | 2 | 2 | 2 | 2 |
| Water, pbw | 4.5 | 4.5 | 4.5 | 4.5 | 4.5 | 4.5 |
| Isocyanate index | 100 | 110 | 120 | 100 | 110 | 120 |
| Water index | 100 | 89.5 | 80.9 | 100 | 89.5 | 80.9 |
| Resilience | 14.1 | 13.4 | 14.2 | 14.6 | 15.1 | 16.6 |
| Density, not crushed, kg/m³ | 33.7 | 33.1 | 32.3 | 30.9 | 28.4 | 30.9 |
| CLD at 40%, not-crushed, dry, kPa | 37 | 41.7 | 47.7 | 20.9 | 23.5 | 24.8 |
| ΔV, not crushed, % | 19.1 | 12.4 | 14.9 | 23.5 | 18.8 | 10.5 |
| $pF_0$, not-crushed, % | 95.9 | 96.2 | 96 | 86.7 | 89.5 | 92.6 |
| $pF_{0.7}$, not-crushed, % | 95.1 | 95.4 | 94.3 | 45.4 | 52.1 | 58.7 |
| $pF_1$, not-crushed, % | 41.8 | 64.6 | 62.3 | 12.1 | 17.7 | 25.7 |
| $pF_{1.5}$, not-crushed, % | 10.8 | 11.9 | 12.8 | 5.3 | 6.8 | 10.1 |
| $pF_2$, not-crushed, % | 9.3 | 8 | 6.6 | 5.1 | 6.4 | 9.7 |
| WBC ($pF_0 - pF_{1.5}$), not-crushed, % | 85 | 84.3 | 83.2 | 81.3 | 82.7 | 82.4 |

(—) means not present or not measured

TABLE 8

Growth test results.

| | Foam 1 | LLP 1169 C Foam 7 | LLP 1170 C Foam 8 |
|---|---|---|---|
| Polyisocyanate 1, pbw | 38.4 | 114.2 | — |
| Polyisocyanate 2, pbw | — | — | 101.4 |
| Polyol 1, (F555), pbw | — | 38 | 38 |
| Polyol 2, (Jeffol ® G11-56), pbw | — | 62 | 62 |
| Polyol 3, (F442), pbw | 7.9 | — | — |
| Polyol 4, (F489), pbw | 48 | — | — |
| Catalyst 1, pbw | 0.3 | 1 | 1 |
| Catalyst 2, pbw | 0.02 | 0.1 | 0.1 |
| Surfactant 1, pbw | 0.25 | — | — |
| Surfactant 2, pbw | — | 2 | 2 |
| Water | 5.1 | 4.5 | 4.5 |
| Index | 39 | 120 | 110 |
| Water index | 276.8 | 80.9 | 89.5 |
| Seeding date | Jul. 10, 2011 | Jul. 10, 2011 | Jul. 10, 2011 |
| Transplant date | Dec. 10, 2011 | Dec. 10, 2011 | Dec. 10, 2011 |
| Harvest | 25-10-2011 | 25-10-2011 | 25-10-2011 |
| Average weight plants (g) | 1.7 | 8.1 | 7.9 |
| Relative yield(*) (%) | 21 | 100 | 97.5 |

(—) means not present or not measured
(*)yield relative to the average plant weight of foam 7

The invention claimed is:

1. A plant growth medium made of a polyurethane foam having a resilience, measured according to ISO 8307, of at most 40%; a compression load deflection at 40%, measured according to ISO 3386/1, of at least 16 kPa; a free-rise core density, measured according to ISO 845, of at least 20 kg/m³; and a volume increase at water saturation of at most 25% wherein the polyurethane foam is obtained from the reaction at an isocyanate index of 90-150 of:

a polyisocyanate component selected from (i) a polyisocyanate comprising diphenylmethane diisocyanate and homologues thereof having an isocyanate functionality of 3 or more wherein the amount of diphenylmethane diisocyanate, based on the total weight of the (i) polyisocyanate, is in the range of 25-70% by weight, and (ii) a prepolymer having an NCO-value of 10-30% by weight obtained from first reacting the (i) polyisocyanate and a polyol having an average molecular weight of 62-7000 and an average nominal hydroxyl functionality of 2-6;

a first polyoxyethylene polyoxypropylene polyol having an average nominal hydroxy functionality of 2-6, a number average molecular weight of 2000-12000, an oxyethylene content of more than 50% weight, based on the weight of the first polyoxyethylene polyoxypropylene polyol;

a second polyoxyethylene polyoxypropylene polyol having an average nominal hydroxy functionality of 2-6, a number average molecular weight of 2000-6000, an oxyethylene content of 20-45% by weight, based on the weight of the second polyoxyethylene polyoxypropylene polyol; and water wherein the weight ratio of the first polyoxyethylene polyoxypropylene polyol and the second polyoxyethylene polyoxypropylene polyol used ranges from 60:40 to 20:80.

2. The plant growth medium according to claim 1, wherein the compression load deflection at 40%, measured according to ISO 3386/1, is at least 20 kPa, the free-rise core density, measured according to ISO 845, is 20 up to 50 $kg/m^3$, the resilience, measured according to ISO 8307, is at most 30% and the volume increase at water saturation is at most 20%.

3. The plant growth medium according to claim 1, wherein the volume of water retained in a sample of the polyurethane foam having a dimension of 100×120×75 mm, expressed as $pF_0$, saturated with water and subjected to a pressure of 0 cm $H_2O$ column is at least 70% and wherein the volume of water retained in the sample of polyurethane foam having the dimension of 100×120×75 mm, expressed as $pF_1$, saturated with water and subjected to a pressure of −10 cm $H_2O$ is 10-90%, wherein $pF_0$ and $pF_1$ are further defined as $$pF_0 = V_u/V_f \times 100(\%)$$

$$pF_1 = V_{r-1}/V_f \times 100(\%)$$

wherein:
  $V_f$ is the volume, in ml, of the foam sample,
  $V_u$ is the water uptake, in ml, of the foam sample saturated with water and subjected to a pressure of 0 cm $H_2O$ column for 30 min, in ml,
  $V_{r-1}$ is the volume of the water retained in the foam sample saturated with water and subjected to a pressure of −10 cm $H_2O$ column for 24 h, in ml.

4. The plant growth medium according to claim 3, wherein $pF_0$ is at least 80%.

5. The plant growth medium according to claim 3, wherein $pF_1$ is at least 50%.

6. Process for making a plant growth medium made of a polyurethane foam having a resilience, measured according to ISO 8307, of at most 40%; a compression load deflection at 40%, measured according to ISO 3386/1, of at least 16 kPa; a free-rise core density, measured according to ISO 845, of at least 20 $kg/m^3$; and a volume increase at water saturation of at most 25% comprising reacting at an isocyanate index of 90-150:

a polyisocyanate component selected from (i) a polyisocyanate comprising diphenylmethane diisocyanate and homologues thereof having an isocyanate functionality of 3 or more wherein the amount of diphenylmethane diisocyanate, based on the total weight of the (i) polyisocyanate, is in the range of 25-70% by weight, and (ii) a prepolymer having an NCO-value of 10-30% by weight obtained from first reacting the (i) polyisocyanate and a polyol having an average molecular weight of 62-7000 and an average nominal hydroxyl functionality of 2-6; and a first polyoxyethylene polyoxypropylene polyol having an average nominal hydroxy functionality of 2-6, a number average molecular weight of 2000-12000, an oxyethylene content of more than 50% weight, based on the weight of the first polyoxyethylene polyoxypropylene polyol; and a second polyoxyethylene polyoxypropylene polyol having an average nominal hydroxy functionality of 2-6, a number average molecular weight of 2000-6000, an oxyethylene content of 20-45% by weight, based on the weight of the second polyoxyethylene polyoxypropylene polyol; and water;

wherein the weight ratio of the first polyoxyethylene polyoxypropylene polyol and the second polyoxyethylene polyoxypropylene polyol used ranges from 60:40 to 20:80.

7. The process according to claim 6 wherein the isocyanate index is 95-120.

8. The process according to claim 6, wherein the amount of diphenylmethane diisocyanate, based on the total weight of the (i) polyisocyanate, is in the range of 25-55% by weight.

9. The process according to claim 6, wherein the polyisocyanate component is a prepolymer having an NCO-value of 10-30% by weight and made by first reacting the (i) polyisocyanate with a polyol having a number average molecular weight of 62-7000, a number average nominal hydroxyl functionality of 2-6, and an oxyethylene content of at least 50%.

10. The process according to claim 6, wherein the first polyoxyethylene polyoxypropylene polyol has a number average nominal hydroxy functionality of 2-4, a number average molecular weight of 2000-8000, an oxyethylene content of more than 60% weight, based on the weight of the first polyoxyethylene polyoxypropylene polyol, and wherein the second polyoxyethylene polyoxypropylene polyol has an average nominal hydroxy functionality of 2-4, a number average molecular weight of 2000-4000, an oxyethylene content of 20-35% by weight, based on the weight of the second polyoxyethylene polyoxypropylene polyol, and wherein the oxyethylene groups in the first polyoxyethylene polyoxypropylene polyol and the second polyoxyethylene polyoxypropylene polyol are randomly distributed.

11. A process according to claim 6, wherein the total oxyethylene content of the first polyoxyethylene polyoxypropylene polyol and the second polyoxyethylene polyoxypropylene polyol is lower than 50% by weight based on the total weight of.

12. A process according to claim 6, wherein the weight ratio of the first polyoxyethylene polyoxypropylene polyol and the second polyoxyethylene polyoxypropylene polyol ranges from 49:51 to 20:80.

13. A process according to claim 6, wherein the first polyoxyethylene polyoxypropylene polyol and the second polyoxyethylene polyoxypropylene polyol are first mixed to form a stable dispersion of polyols and then added to the polyisocyanate component.

14. The process according to claim 13, wherein the average weight ratio of the oxyethylene content in the stable dispersion of polyols is less than 50%, based on the weight of the stable dispersion of polyols.

15. The process according to claim 6, wherein the polyurethane foam is prepared with at least one component selected from isocyanate-reactive chain extenders, cross-linkers having a number average molecular weight of 60-1999 and auxiliary additives other than chain extenders and cross-linkers.

16. The process according to claim 6, wherein the foam is made in a mould with an overpack of at most 100%.

17. The plant growth medium according to claim 1, wherein the compression load deflection at 40%, measured according to ISO 3386/1, is at least 25 kPa.

18. The plant growth medium according to claim 4, wherein $pF_0$ is at least 90%.

19. The plant growth medium according to claim 5, wherein $pF_1$ is at least 60%.

20. The plant growth medium according to claim 5, wherein $pF_1$ is at least 70%.

* * * * *